United States Patent [19]

Miyahara

[11] Patent Number: 4,612,199
[45] Date of Patent: Sep. 16, 1986

[54] METHOD OF AND APPARATUS FOR PRODUCING PROCESSED FOODSTUFFS BY PASSING AN ELECTRIC CURRENT

[75] Inventor: Kingo Miyahara, Tokyo, Japan
[73] Assignee: Dowa Co., Ltd., Tokyo, Japan
[21] Appl. No.: 715,444
[22] Filed: Mar. 25, 1985

[30] Foreign Application Priority Data

Apr. 3, 1984 [JP] Japan .................................. 59-66385

[51] Int. Cl.⁴ .......................... A23L 3/00; A23L 3/32; A61L 2/04
[52] U.S. Cl. ....................................... 426/237; 99/451; 219/10.81; 422/22; 426/241; 426/244; 426/521
[58] Field of Search ............... 426/244, 234, 241, 107, 426/521, 237, 238; 99/358, 451; 422/22; 219/10.81

[56] References Cited

U.S. PATENT DOCUMENTS 2,945,935  7/1960  Messner et al. ................... 426/234
4,089,982  5/1978  Miyahara .......................... 426/244

FOREIGN PATENT DOCUMENTS 57-174050  10/1982  Japan .

Primary Examiner—George Yeung
Attorney, Agent, or Firm—Pollock, Vande Sande & Priddy

[57] ABSTRACT

A method of and an apparatus for producing processed foodstuffs by passing an electric current to foodstuff materials including a container of insulating material open at opposite sides for receiving a foodstuff material suitably permeated with a salt solution which is placed in the container and held between a pair of electrode members located at the opposite open sides of the container. An annular coil is arranged around the container. As electric currents are passed simultaneously through the annular coil and between the pair of electrode members, Joule heat is generated in the foodstuff material to thermally treat and sterilize the foodstuff material while lines of magnetic force are produced and applied to the foodstuff material in such a manner that an AC magnetic field exerts influences on the electric current flowing through the foodstuff material, to render substantially uniform the temperature distribution in the foodstuff material and increase the amount of inosinic acid or glutamic acid therein.

2 Claims, 4 Drawing Figures

METHOD OF AND APPARATUS FOR PRODUCING PROCESSED FOODSTUFFS BY PASSING AN ELECTRIC CURRENT

BACKGROUND OF THE INVENTION

(1) FIELD OF THE INVENTION

This invention relates to a method of producing processed foodstuffs by passing an electric current to foodstuff materials which is capable of improving the flavor and taste of processed foodstuffs produced by passing an electric current to foodstuff materials while enabling any and every one to provide delicious processed foodstuffs which are ready to be instantly served on the table, and an apparatus suitable for carrying the method into practice.

(2) DESCRIPTION OF THE PRIOR ART

I have developed previously, as described in Japanese Patent Laid-Open No. 174050/82, a method of producing processed foodstuffs by passing an electric current to foodstuff materials wherein a foodstuff material to be processed, such as raw meat of cattle, a marine product, such as fish, or an agricultural produce, such as bean, corn, etc., is uniformly permeated with a salt solution and then placed in a container of insulating material which is open at opposite sides while a pair of electrode members are placed on opposite sides of the foodstuff material in the container. When it is desired to process the foodstuff material, an electric current is passed thereto through the electrode members which are brought into pressing contact with the foodstuff material, so as to generate Joule heat for processing the foodstuff material to provide a processed foodstuff which is thermally treated and sterilized.

In this method of the prior art for producing an electrically processed foodstuff, it is possible to instantly treat and sterilize the foodstuff material by Joule heat generated by the electric current without allowing the characteristic flavor of the foodstuff to escape to outside, thereby providing a thermally treated foodstuff which is rich in falvor and high in taste.

However, some disadvantages are associated with this method of the prior art of producing a thermally treated foodstuff by passing a current to a foodstuff material. In this method, it is possible to increase to a certain extent the amount of inosinic acid or glutamic acid which is instrumental in increasing the flavor and taste of the foodstuff when a foodstuff material is processed by passing a current thereto as described hereinabove as compared with a foodstuff which is not processed by the method. However, when it is desired to further increase the flavor and taste of the foodstuff after processing the foodstuff material by passing a current thereto, the end cannot be attained without using an additive, such as a chemical seasoning including a sodium salt, which would be added separately from the passing of the current. Besides, even if the electric current is passed uniformly to the foodstuff material, the Joule heat generated would be lower in temperature in portions of the foodstuff material which face the container of insulating material than in a central portion thereof, thereby making it impossible to uniformly heat the foodstuff material by the generated Joule heat to thermally treat and sterilize same and achieve uniformity in the flavor and taste of the foodstuff provided by the method.

The problems which the present invention proposes to obviate are as follows. In the method of the prior art developed by me previously for processing a foodstuff material by passing an electric current, it is impossible to increase by simple means the amount of inosinic acid or glutamic acid which is instrumental in increasing the flavor and taste of a foodstuff without using a food additive, such as a chemical seasoning, to thereby increase the flavor and taste of the foodstuff produced by passing an electric current to the foodstuff material. In addition, in the method described hereinabove, it is impossible to achieve a uniform temperature distribution in the foodstuff material processed by passing an electric current to generate Joule heat, thereby making it impossible to achieve uniformity of flavor and taste in the thermally treated foodstuff. These are the problems which the present invention proposes to obviate.

SUMMARY OF THE INVENTION

(1) Objects of the Invention

An object of this invention is to provide a method of producing a foodstuff by processing a foodstuff material by passing an electric current which enables uniform temperature distribution to be achieved in the foodstuff material in which Joule heat is generated by the electric current for thermally treating and sterilizing the foodstuff material and allows the amount of inosinic acid or glutamic acid which is instrumental in increasing the flavor and taste of the foodstuff to be increased with ease, to thereby further increase the flavor and taste of the foodstuff produced by electric processing.

Another object is to provide an apparatus suitable for carrying into practice the aforesaid method of processing a foodstuff material by passing an electric current.

(2) Statement of the Invention

The invention is based on the discovery that if, when a foodstuff material to be processed by passing a current is uniformly permeated with a salt colution and placed in a container of insulating material while being held between and kept in pressing contact with a pair of electrode members, an annular coil is arranged around the container and electric currents are passed simultaneously through the annular coil and the pair of electrode members to the foodstuff material, it is possible to cause the Joule heat generated by the electric current passed through the electrode members and the lines of magnetic force produced by the electric current passed through the annular coil to act simultaneously on the foodstuff material. Thus, an alternating current magnetic field is produced by the lines of magnetic force and acts on the electric current passed to the foodstuff material through the electrode members, with a result that the alternating current magnetic field achieves the effects or rendering substantially uniform the distribution of the temperature of the foodstuff material which is raised by the Joule heat and at the same time of markedly increasing the amount of inosinic acid or glutamic acid in the thermally treated foodstuff, thereby making it possible to readily and continuously produce delicious foodstuffs of increased flavor and taste by electrically processing foodstuff materials.

To accomplish the aforesaid objects, there is provided a method of producing processed foodstuffs by passing an electric current to foodstuff materials, comprising the steps of uniformly permeating a foodstuff material with a salt solution, placing the salt solution permeated foodstuff material in a container of insulating material having an annular coil arranged around it, said salt solution permeated foodstuff material being interposed between a pair of electrode members, and passing electric currents simultaneously through the annular coil and between the pair of electrode members, whereby the foodstuff material processed by the electric current passed thereto can be thermally treated and sterilized at a substantially uniform temperature by lines of magnetic force and Joule heat generated by the electric currents.

According to the invention, there is also provided an apparatus suitable for carrying the aforesaid method into practice, comprising a container of insulating material open at opposite sides for receiving a foodstuff material placed therein, a pair of electrode members located at the open opposite sides of the container, and an annular coil arranged around the container of insulating material for producing lines of magnetic force.

DESCRIPTION OF THE PREFERRED EMBODIMENTS

Preferred embodiments of the invention will now be described by referring to the accompanying drawings.

First of all, a foodstuff material A to be processed by passing an electric current thereto which may be raw meat of cattle or fish or other marine product, which may be either as it is or minced, or one of agricultural produces including bean, corn, etc., is steeped in a salt solution B which may be a 2.9% aqueous solution of salt, for example, contained in a vessel 1, so as to allow the foodstuff material A to be uniformly permeated with the salt solution B. This steeping of the foodstuff material A in the salt solution enables an electric current passed thereto in the next following step to uniformly flow therethrough and at the same time allow the flavor and taste of the foodstuff produced to be increased.

Figure 1:
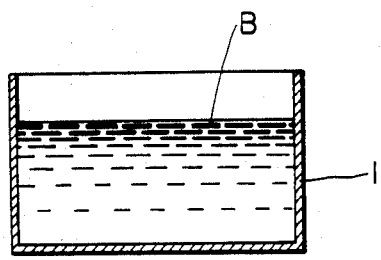
FIG. 1 is a vertical sectional front view of a vessel for containing a salt solution.
Figure 2:
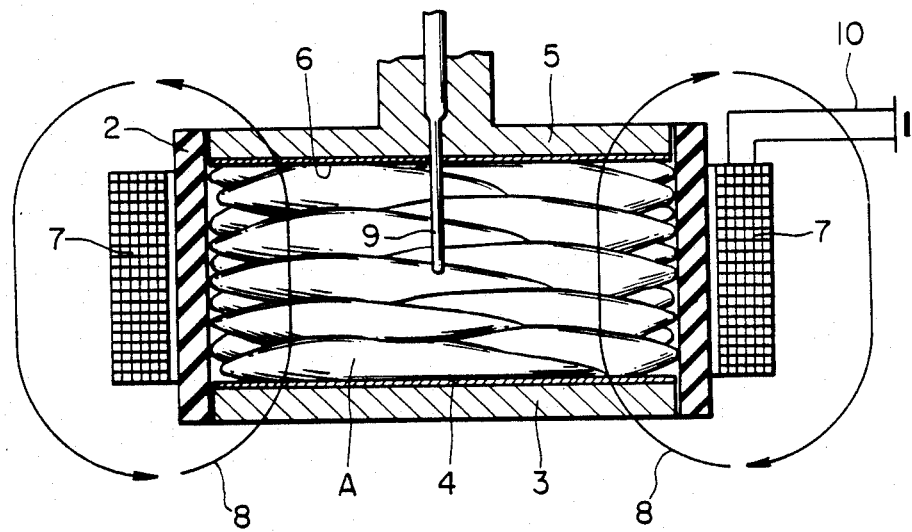
FIG. 2 is a vertical sectional front view, with certain parts being cut out, of the apparatus for producing foodstuffs by passing an electric current to foodstuff materials to thermally treat and sterilize same which comprises one embodiment of the invention.

Then, the foodstuff material A is withdrawn from the vessel 1 and, after having the salt solution removed from its surface, placed in a container 2 formed of insulating material shown in FIG. 2. The container 2 is open at upper and lower sides and has an annular coil 7 arranged around it to produce lines of magnetic force 8. An electrode member 3 having a salt solution containing electrode contact member 4 attached to its top surface is located at the lower side of the container 2 to close the open lower side and support the foodstuff material A placed in the container 2, and another salt solution containing electrode contact member 6 is placed on the foodstuff material A in intimate contact therewith. Then, another electrode member 5 is force fitted in the container 2 and placed on the salt solution containing electrode contact member 5, so that the foodstuff material A is brought into intimate contact with the pair of electrode members 3 and 5 through the pair of salt solution containing electrode contact members 4 and 6, respectively.

After the foodstuff material A is contained in the container 2 as described hereinabove, an electric current is passed between the pair of electrode members 3 and 5 and at the same time an electric current is passed through the annular coil 7. The current passed between the two electrode members 3 and 5 flows through the foodstuff material A and generates Joule heat which quickly raises the temperature in the foodstuff material A to about 90° C. to thereby thermally treat and sterilize same. At the same time, the lines of magnetic force 8 produced by the electric current passing through the annular coil 7 act on portions of the foodstuff material A disposed adjacent a wall of the container 2 of insulating material in such a manner that the temperature in these portions of the foodstuff material A is raised. As a result, the disadvantage of the prior art that, in the process of passing a current to the foodstuff material to thermally treat and sterilize same, the temperature of the portions of the foodstuff material adjacent the wall of the container of the insulating material becomes lower than that of the central portion of the foodstuff material can be obviated. Thus, the foodstuff material A is uniformly heated according to the invention and the temperature distribution in the foodstuff material A is rendered substantially uniform as the foodstuff material A is heated by Joule heat, so that it is possible to provide a foodstuff which is uniformly treated and sterilized by heat. Thus, the foodstuff thermally treated as described hereinabove has a flavor and taste which is uniform through out the foodstuff. In addition, the alternating magnetic field acting on the foodstuff material A also acts on the electric current flowing through the foodstuff material A in such a manner that the amount of inosinic acid or glutamic acid therein is greatly increased, so that the foodstuff obtained by processing the foodstuff material A as described hereinabove has an increased flavor and taste, as compared with a foodstuff subjected to a similar treatment of the prior art. After the foodstuff material A is thermally treated and sterilized by Joule heat which raises the temperature of the foodstuff material A to a predetermined level, a temperature sensor 9 produces a signal for automatically interrupting the supply of currents to the pair of electrode members 3 and 5 and the annular coil 7.

The foodstuff material A to which a current is passed to thermally treat and sterilize same may be in minced form. When this is the case, salt is added to the foodstuff material A in such a manner that the concentration of salt therein is 2.9%, for example.

The container 2 is formed of a heat resisting insulating material, such as synthetic resin, porcelain, ceramics, glass, etc., which enables the foodstuff material A permeated with salt and placed in the container 2 to be uniformly treated and sterilized by Joule heat generated by an electric current passed between the pair of electrode members 3 and 5. The container 2 which is high in permeability is open at upper and lower sides. The open lower side is closed by the electrode member 3 having the salt solution containing electrode contact member 4 attached to its top surface, and the open upper end is closed by the salt solution containing electrode contact member 6 placed on the foodstuff material A contained in the container 2 and the electrode member 5 is elevatorily deposited on the electrode contact member 6. When the foodstuff material A is placed in the container 2 as described hereinabove, an electric current is passed between the two electrode members 3 and 5 while a pressure is being applied to the foodstuff material A held between them, so that Joule heat is generated in the foodstuff material A to heat same to a temperature in the range between 80° and 90° C. to thermally treat and sterilize same.

The annular coil 7 arranged around the container 2 of insulating material is of an air core type and produces lines of magnetic force 8 when a current is passed therethrough. The lines of magnetic force 8 exert influences on portions of the foodstuff material A located adjacent the wall of the container 2 in such a manner that the alternating current magnetic field acts on the electric current flowing through the foodstuff material A to raise the temperature of the portions of the foodstuff material A disposed adjacent the wall of the container 2, to thereby eliminate the phenomenon that the temperature of the portions of the foodstuff material A disposed adjacent the wall of the container A is somewhat lower than the temperature of the central portion of the foodstuff material A as the latter is heated by Joule heat generated by the current passed thereto. By virtue of the provision of the annular coil 7 located around the container 2, the temperature distribution in the foodstuff material A in which Joule heat is generated by the electric current is rendered substantially uniform and thermal treating and sterilizing can be effected uniformly throughout the foodstuff material A, to achieve uniformity and stability of flavor and taste in the foodstuff produced. In addition, the amount of inosinic acid or glutamic acid which is instrumental in increasing the flavor and taste of a foodstuff can be increased in the foodstuff produced by using the container 2 having the annular coil 7. This makes it possible to increase the flavor and taste of the foodstuff produced by passing a current to the foodstuff material A without adding any food additive, such as a chemical seasoning.

The temperature sensor 9 is in the form of a probe inserted through a substantially central portion of the electrode member 5 closing the open upper end of the container 2 into the body of the foodstuff material A for monitoring the temperature of the latter. The numeral 10 designates leads for the annular coil 7.

Figure 3:
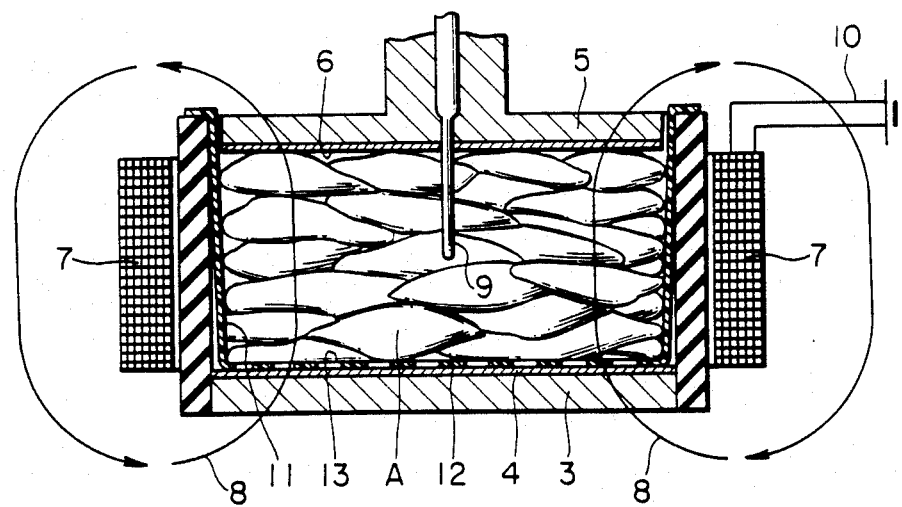
FIG. 3 is a vertical sectional front view, with certain parts being cut out, of the apparatus similar to that shown in FIG. 2 but comprising another embodiment of the invention.

In the embodiment of the apparatus for producing foodstuffs by passing an electric current shown and described hereinabove, the foodstuff material A to be thermally treated and sterilized is directly placed in the container 2 of insulating material. FIG. 3 shows another embodiment in which the foodstuff material A is indirectly inserted in the container 2. More specifically, the foodstuff material A is first placed in a container 11 of heat resisting material in the form of a cup of substantially the same shape as the container 2 of insulating material, so that the container 11 containing the foodstuff material A can be placed in the container 2 of insulating material. The container 11 includes a bottom wall 12 formed with a multiplicity of current passing apertures 13 for bringing the foodstuff material A into contact with the salt solution containing electrode contact member 4.

The provision of the inner container 11 enables the foodstuff obtained by passing a current to the foodstuff material A to be preserved over a prolonged period of time by sealing same. Besides, the use of the inner container 11 is conducive to improved sanitary condition of the processed foodstuff produced by passing an electric current to the foodstuff material A.

Figure 4:
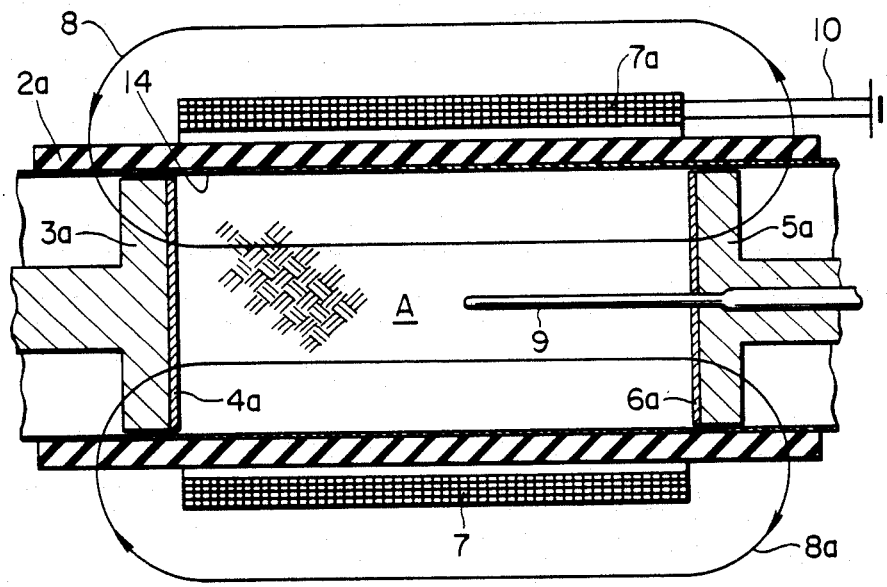
FIG. 4 is a vertical sectional front view, with certain parts being cut out, of the apparatus similar to that shown in FIG. 3 but comprising still another embodiment of the invention.

When the foodstuff material A is in minced form, it will be necessary to avoid the outflow of the foodstuff material A while the foodstuff material A is being processed, to obtain a foodstuff of a predetermined shape. FIG. 4 shows still another embodiment which serves this purpose. In the embodiment shown in FIG. 4, the foodstuff material A is inserted in a bag 14 of heat resisting and insulating material which is open at opposite lateral sides when it is thermally treated and sterilized by passing a current thereto. More specifically, the foodstuff material A in miced form is permeated with a salt solution and then put in the bag 14 which is then placed in the container 2a of insulating material. Then, the salt solution containing electrode contact member 4a and electrode member 3a are inserted through one lateral open side while the salt solution containing electrode member 6a having the temperature sensor 9 and electrode member 5a are inserted through the opposite lateral open side to bring the foodstuff material A into intimate contact with the salt solution containing electrode contact members 4a and 6a. While the foodstuff material A is in this condition, an electric current is passed between the pair of electrode members 3a and 5a while an electric current is simultaneously passed through the annular coil 7a arranged around the container 2 of insulating material. Thus, the foodstuff material A of minced form can be uniformly treated and sterilized by the actions of Joule heat and lines of magnetic force 8a produced by the currents. Thus, it is possible to continuously produce foodstuffs of improved and uniform flavor and taste in a stable manner.

The invention can achieve the following effects. By virtue of the Joule heat and the lines of magnetic force generated by the electric current simultaneously passed between the pair of electrode members and through the annular coil, it is possible to raise the temperature of the foodstuff material qucikly as Joule heat is generated in a manner to allow the temperature distribution to become uniform. Thus, the foodstuff material is subjected to thermal treatment and sterilization in a short period of time, to readily and positively provide a foodstuff of a flavor and taste which is uniform and improved, as compared with a foodstuff treated by a similar process of the prior art. Moreover, the alternating current magnetic field acts on the electric current flowing through the foodstuff material in such a manner that the amount of inosinic acid or glutamic acid which is instrumental in increasing the flavor and taste of a foodstuff can be increased in the foodstuff produced, so that the invention is capable of producing processed foodstuffs of improved flavor and taste by passing an electric current to foodstuff materials.

The Institute of Foodstuff Technology in Tokyo has conducted tests on a processed foodstuff produced by the method according to the invention. The conditions and results of the tests are as follows:

| Conditions and Results of the Tests | |
|---|---|
| The Name of samples tested | Minced sardine (100%) |
| The amount of each sample | 400 g |
| The salt content of each sample | 2.9% |
| The period of time for passing an electric current | 3 minutes |
| The magnetic force of the annular coil | 54 Gauss |
| The temperature for thermal treatment and sterilization | 90° C. |

-continued

| Conditions and Results of the Tests | |
|---|---|
| The amount of inosinic acid | 25 mg % |

Since the foodstuff material tested was a marine product, a processed foodstuff produced by the method of passing an electric current to the foodstuff material according to the invention was compared with a foodstuff of the same material which was not cooked and raw, and a foodstuff of the same material that was cooked in an ordinary fashion, with regard to the amount of inosinic acid. The results show that, as shown hereinabove, the foodstuff produced by the method according to the invention has the largest amount of inosinic acid which is responsible for increasing the flavor and taste of marine products.

| Comparison of the Results | |
|---|---|
| Condition of Foodstuffs | The amount of Inosinic Acid mg % |
| Raw | 1 |
| Ordinarily Cooked | 9 |
| Processed by the Method according to the Invention | 25 |

What is claimed is:

1. A method of producing processed foodstuffs by passing an electric current to foodstuff materials, comprising the steps of:

uniformly permeating a foodstuff material with a salt solution;

placing the salt solution permeated foodstuff material in a container of insulating material having an annular coil arranged around it, said salt solution permeated foodstuff material being interposed between a pair of electrode members; and passing electric currents simultaneously through the annular coil and between the pair of electrode members, whereby the foodstuff material processed by the electric current passed thereto is thermally treated and sterilized at a substantially uniform temperature by lines of magnetic force and Joule heat generated by the electric currents.

2. An apparatus for producing processed foodstuffs by passing an electric current to foodstuff materials, comprising:

a container of insulating material open at opposite sides for receiving a foodstuff material placed therein;

a pair of electrode members located at the open opposite sides of the container;

an annular coil arranged around the container of insulating material for producing lines of magnetic force; and means for passing electric currents simultaneously through the annular coil and between the pair of electrode members, whereby the foodstuff material processed by the electric current passed thereto is thermally treated and sterilized at a substantially uniform temperature by lines of magnetic force and Joule heat generated by the electric currents.

* * * * *